No. 679,554. Patented July 30, 1901.
J. J. DOLAN.
TANK HEATER.
(Application filed Apr. 13, 1901.)
(No Model.)

Witnesses:
Watson Hurlburt.
Wm. Geiger

Inventor:
James J. Dolan
By Louis K. Gillson Atty.

THE NORRIS PETERS CO., PHOTO-LITHO., WASHINGTON, D. C.

UNITED STATES PATENT OFFICE.

JAMES J. DOLAN, OF SANDWICH, ILLINOIS, ASSIGNOR TO SANDWICH MANUFACTURING CO., OF ILLINOIS.

TANK-HEATER.

SPECIFICATION forming part of Letters Patent No. 679,554, dated July 30, 1901.

Application filed April 13, 1901. Serial No. 55,709. (No model.)

*To all whom it may concern:*

Be it known that I, JAMES J. DOLAN, a citizen of the United States, and a resident of Sandwich, county of Dekalb, and State of Illinois, have invented certain new and useful Improvements in Tank-Heaters, of which the following is a specification and which are illustrated in the accompanying drawings, forming a part thereof.

My invention relates to certain new and useful improvements in tank-heaters or feed-cookers, having for its object to improve and simplify the construction thereof; and it consists of certain novel features to be hereinafter described and which are illustrated in the accompanying drawings, in which—

Figure 2:
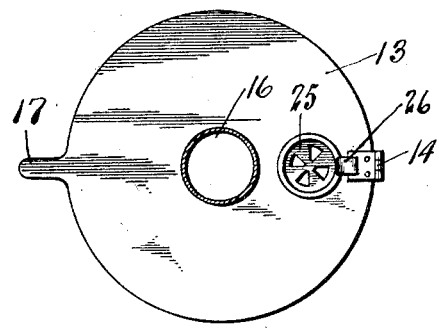
Figure 3:
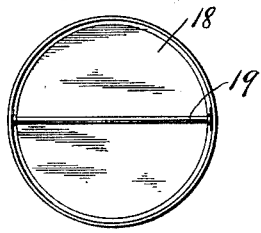
Figure 1:
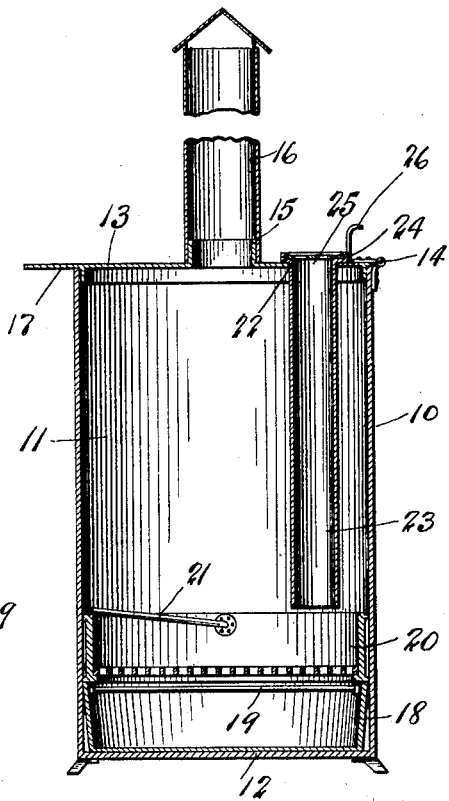

Figure 1 is a vertical sectional view of the tank-heater. Fig. 2 is a plan view of the same, and Fig. 3 is a detail.

The body or casing 10 of the heater, providing a combustion-chamber 11, is preferably cylindrical in shape and provided with a bottom 12. The upper open end of the casing 10 is closed by a lid or cover 13, hinged at 14, which cover has a smoke-opening surrounded by a nipple or flange 15, projecting into the end of and supporting the smoke-pipe 16. A lip 17, cast integral with the cover, furnishes convenient means for opening the same.

Located in the bottom of the combustion-chamber 11 is an ash-pan 18, having a cross-piece 19, providing a handle for the removal of the same, and resting on the ash-pan is a fire-pot 20, having a bail 21.

The cover 13 has an aperture 22, passing through which and depending in the combustion-chamber 11 is a draft-tube 23, an annular flange 24 at the upper end of the same resting on the cover 13 to support the tube, which hangs loosely in the aperture and is capable of a vertical movement. A damper 25 at the upper end of the tube regulates the draft to the combustion-chamber, and a finger-piece 26, projecting from the flange 24, is provided for raising the draft-tube.

In use the heater is placed in the receptacle containing the feed or water to be heated, and the arrangement of the parts is such that it is not necessary to remove the heater from the receptacle to start the fire, to replenish the same, or to remove the ashes.

When it is desired to replenish the fire or to remove the fire-pot 20 and the ash-pan 18, the draft-tube 23, carried by the cover 13, is raised through the aperture 22 until the end thereof is in such position that it will clear the side of the casing 10, when the cover is swung over on its hinge 14. When the cover is closed again, the draft-tube will of itself slide or may be readily pushed into its usual position. The depending draft-tube 23 directs an ample supply of air upon the top of the fire, greatly facilitating combustion, and its movability relatively to the cover 13 renders it possible to fill the combustion-chamber to a considerable height when the fire is to burn for some time without attention—as, for instance, over night—the draft-tube in such case being elevated, so as to rest upon the top of the fuel, and sliding down by gravity as the fuel is burned away.

The heater is simple in construction, having no parts to get out of order, is easily cleaned, has means for supplying an abundant draft to the combustion-chamber, and being provided with a large expanse of heating-surface heats the feed or water quickly, thereby economizing the fuel.

I claim as my invention—

1. In a tank-heater, in combination, a casing providing a combustion-chamber, a cover for the casing having an aperture therethrough, and a vertically-movable draft-tube carried by the cover and depending through the aperture and into the combustion-chamber.

2. In a tank-heater, in combination, a casing providing a combustion-chamber, a hinged cover for the casing having an aperture therethrough, and a vertically-movable draft-tube carried by the cover and depending through the aperture and into the combustion-chamber.

3. In a tank-heater, in combination, a casing providing a combustion-chamber, a hinged cover for the casing having an aperture therethrough, a vertically-movable draft-tube carried by the cover and depending through the aperture and into the combustion-chamber, the tube being capable of movement relatively to the cover so as to clear the side of the casing when the cover is swung on its hinge, and having a flange to support the tube when lowered into the combustion-chamber.

JAMES J. DOLAN.

Witnesses:
J. P. ADAMS,
C. L. STINSON.